Aug. 1, 1967    R. VINCENS    3,333,752
APPARATUS FOR DESTROYING DOCUMENTS
Filed Aug. 13, 1964    4 Sheets-Sheet 1

Aug. 1, 1967 R. VINCENS 3,333,752
APPARATUS FOR DESTROYING DOCUMENTS
Filed Aug. 13, 1964 4 Sheets-Sheet 2

Aug. 1, 1967    R. VINCENS    3,333,752
APPARATUS FOR DESTROYING DOCUMENTS
Filed Aug. 13, 1964    4 Sheets-Sheet 3
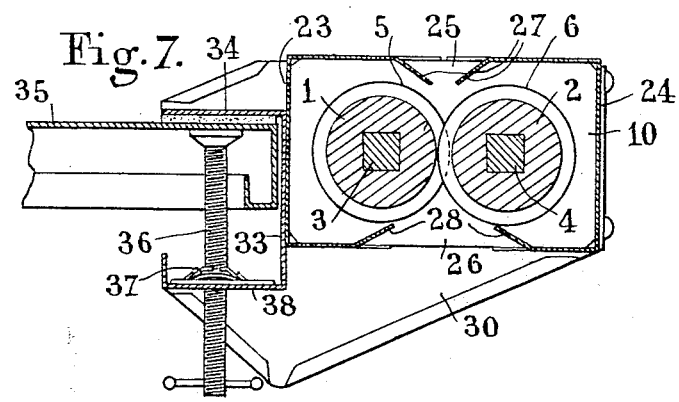
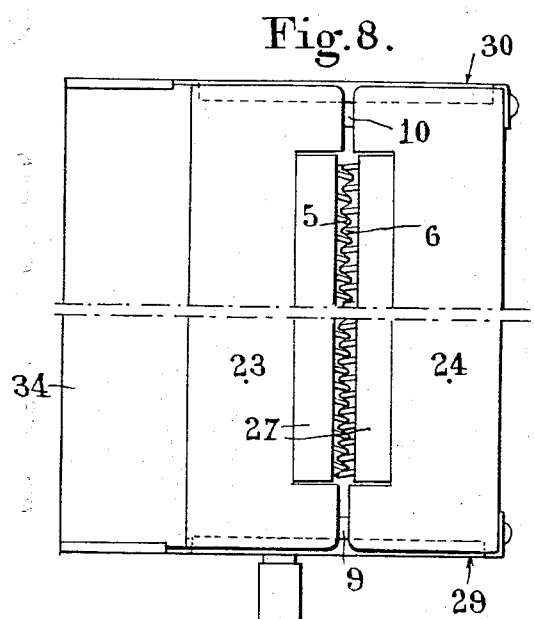
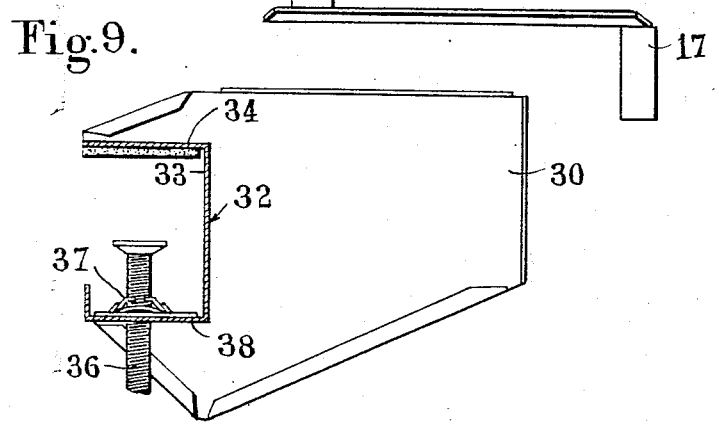

United States Patent Office 3,333,752
Patented Aug. 1, 1967

3,333,752
APPARATUS FOR DESTROYING DOCUMENTS
Rene Vincens, Neuville-les-Dieppe, France, assignor of one-half to Societe Civile de Recherches et d'Etudes Industrielles, Neuville-les-Dieppe, France
Filed Aug. 13, 1964, Ser. No. 389,382
Claims priority, application France, Aug. 14, 1963, 944,728, Patent 1,380,489
5 Claims. (Cl. 225—97)

This invention relates in general to apparatus for destroying documents and has specific reference to an improved apparatus of this character.

Apparatus for destroying documents are already known wherein the documents are torn up into fine shreds or strips, such apparatus comprising to this end a pair of parallel rollers revolving in opposite directions and carrying a number of discs, each disc of one roller extending between two discs of the companion roller without contacting them, the disc assembly performing simultaneously the taking, feeding and cutting of the paper into strips or shreds. These apparatus are equipped with protection devices such as combs, grids, or the like, disposed between the roller discs to prevent the torn strips from winding over the rollers, accumulating thereon and jamming the apparatus.

To avoid this drawback, the present invention provides an apparatus for destroying documents which comprises two rollers having parallel axes which are adapted to be rotatably driven at the same peripheral speeds and in opposite directions to permit the longitudinal engagement, at right angles to the roller axes, of the documents to be destroyed immediately as they are engaged therebetween, this apparatus being characterized in that the co-acting peripheral surfaces of said rollers are arranged with a view to produce in the documents closely-spaced longitudinal folds or pleats alternating in one and the other direction accordion-wise and at the same time, a transverse tractive effort causing by laceration a longitudinal tearing up of the documents between each series of two folds of opposite direction, whereby the documents issuing from the apparatus have the shape of narrow strips having the desired width, with jagged or deckled longitudinal edges, each strip having formed along its longitudinal axis a fold sufficient to impart thereto a rigidity adapted to ensure the proper delivery thereof from the apparatus and thus avoid the detrimental clogging and jamming of the apparatus.

According to a preferred form of embodiment of the apparatus the two rollers or cylinders thereof are formed by moulding about their shafts a material having a relatively high coefficient of friction with paper, notably a thermoplastic or thermosetting resin, and the roller surfaces are formed with screw threads having oppositely directed pitches, the thread edges being sharp enough to break the paper fibres contacting them and form in the paper a sufficiently pronounced fold.

Other features and advantages of this apparatus will appear as the following description proceeds with reference to the accompanying drawings illustrating diagrammatically by way of example typical forms of embodiment of the apparatus constituting the subject-matter of this invention. In the drawings:

FIGURE 7 is a cross-sectional view showing another form of embodiment of the apparatus of this invention which is clamped on the edge of a desk top.

FIGURE 8 is a plan view of the apparatus shown in FIGURE 7.

FIGURE 9 is a detail view showing one of the side plates of the apparatus.

Figure 1:
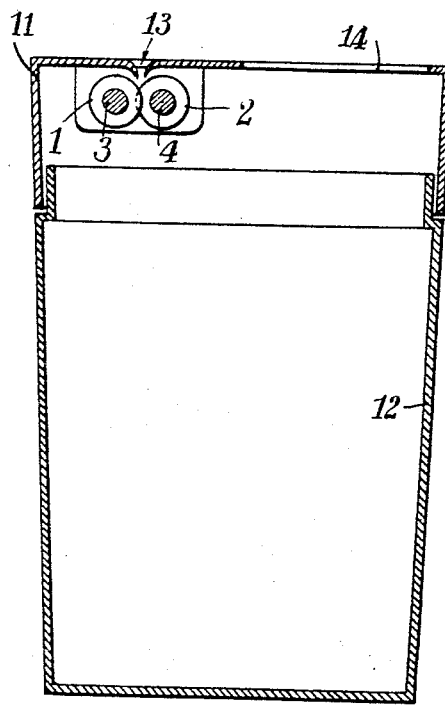
FIGURE 1 is a diagrammatic vertical section showing a first form of embodiment of the apparatus of this invention which is mounted on the top of a waste-paper basket.

The apparatus for destroying documents according to this invention comprises essentially a pair of rollers or cylinders 1, 2 mounted on parallel shafts 3, 4 and formed with peripheral screw-threads 5, 6.

As will be explained presently it is necessary that the two rollers or cylinders adhere properly on the paper and preferably these rollers will be made from suitable thermoplastic or thermosetting resins. It may be advantageous to mold these rollers directly on the metal shafts 3, 4 and the screw threads 5, 6 formed in their surface have a right-hand pitch on one roller and a left-hand pitch on the other roller; of course, circular grooves having trapezoidal or triangular bases may be substituted for these threads.

The threads of the two rollers interpenetrate one another and these rollers are rotatably coupled through a pair of pinions 7, 8 keyed on shafts 3, 4 respectively so that the rollers revolve in opposite directions and at the same speed. If desired the two pinions may be molded integrally with the rollers, or any other suitable driving device may be substituted therefor.

The two shafts 3, 4 are carried at their ends by flanges 9, 10 rigid with the vertical side walls of a casing 11 adapted to fit on the top of a waste-paper basket 12.

The upper portion of this casing has a slot 13 formed therein above the line of interpenetration of threads 5, 6 of rollers 1, 2, a larger aperture 14 being also formed in the casing 11 for introducing into the basket the papers of which the destruction is not deemed necessary.

The longitudinal edges 15, 16 of slot 13 are slightly folded or curved inwards, i.e. towards the rollers 1, 2 to constitute lips assisting in guiding the documents to be destroyed towards the active zone of the two rollers.

Figure 2:
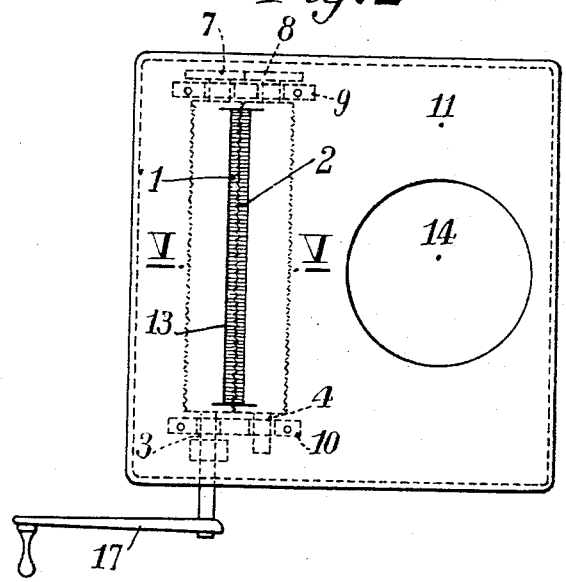
FIGURE 2 is a plan view from above of the same apparatus.

A crank handle 17 is keyed or otherwise secured on the end of one shaft 3 or 4, for example the shaft 3 of roller 1, this shaft being to this end slightly longer than the corresponding shaft 4 of roller 2 and extending through the lateral wall of casing 11 (FIGURE 2).

Figure 3:
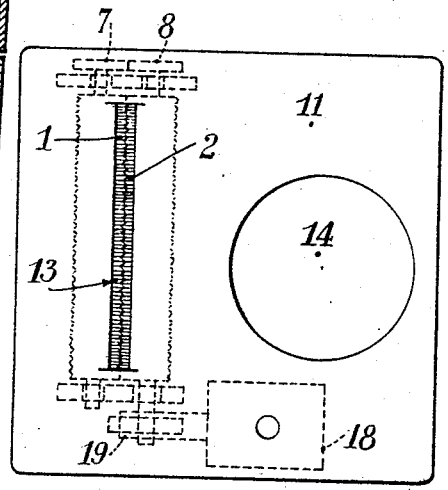
FIGURE 3 is a view similar to FIGURE 2 showing a modified form of embodiment of the same apparatus, equipped with electric drive means.

Of course, automatic means may be used for rotatably driving the rollers, notably in the form of an electromotor 18 mounted under the casing 11 (FIGURE 3) and driving one of said shafts 3 or 4 through a suitable reduction gearing.

Figure 4:
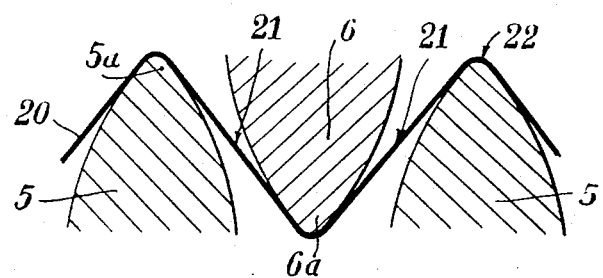
FIGURE 4 is a fragmentary sectional view showing on a considerably enlarged scale the profile of the roller threads.
Figure 5:
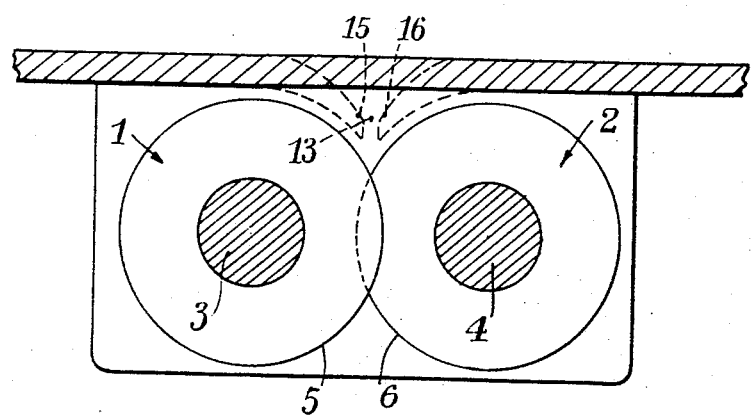
FIGURE 5 is a fragmentary vertical section, taken on a larger scale upon the line V—V of FIGURE 2.

The operation of this apparatus will be described hereinafter with reference more particularly to FIGURE 4.

When the sheet of paper 20 introduced through the slot 13 into the casing 11 is seized by the rollers 1, 2 the screw threads 5, 6 due to their interpenetration, impart a lateral tractive effort thereto by pleating the paper zigzag or accordion-wise. On the other hand, the sheet cannot slip with respect to said threads 5, 6 since these are molded from a material having a relatively high coefficient of friction with paper; thus, the sheet is elongated until its fibres are broken or torn up.

This sheet is tensioned between the edges 5a and 6a of threads 5, 6, and the paper is torn up in a zone 21 located between these edges 5a and 6a.

Figure 6:
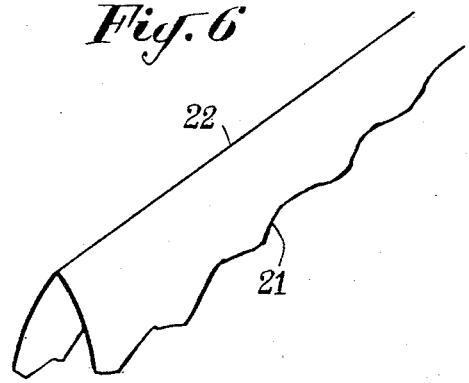
FIGURE 6 is a diagrammatic fragmentary perspective view showing a paper strip as obtaining at the delivery end of the apparatus.
Figure 10:
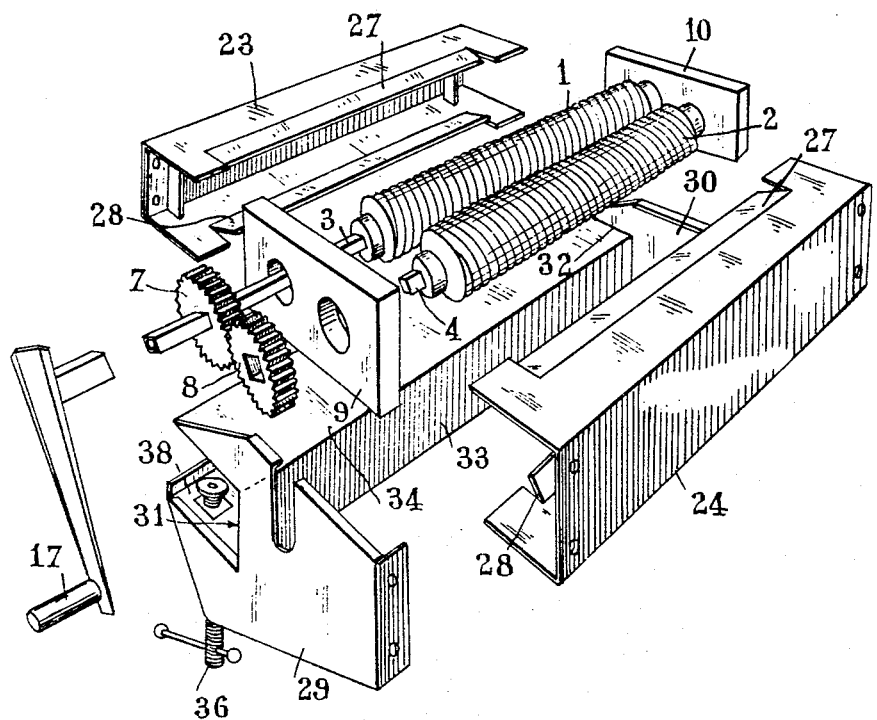
FIGURE 10 is an exploded view of the same apparatus.

Under these conditions the sheet is cut into a great number of very narrow strips having each an intermediate longitudinal crease or fold 22 (FIGURE 6) caused by the breaking of the paper fibres as they contact the edges 5a and 6a. This fold is useful in that it imparts to the strip a certain stiffness sufficient to prevent same from winding over the rollers and cause an untimely and detrimental clogging and jamming of the apparatus.

In the alternate form of embodiment illustrated in FIGURES 7 to 10 of the drawings the apparatus is adapted to be secured along the edge of the top board of a desk, on one side thereof, and the rollers 1, 2 are enclosed in a casing of which the transverse sides consist of the flanges 9, 10 and the longitudinal sides consist of a pair of covering plates 23, 24 bent to a U shape and disposed with their concavities facing each other and fitted over the aforesaid flanges 9, 10; these cover plates are somewhat spaced from each other in order to provide therebetween in the secant plane of said rollers two slots 25, 26 disposed above and beneath the rollers respectively for introducing the documents to be destroyed into the machine and permitting the delivery of the shredded documents therefrom, the longitudinal edges 27, 28 of these two slots being slightly folded or bent inwards in order to constitute on the one hand lips for guiding the documents to be destroyed as they are introduced into the apparatus towards the two rollers thereof, and on the other hand baffle means for facilitating the delivery of the shredded paper.

The casing enclosing the two rollers is carried in turn by a pair of transverse flanges 29, 30 at either end and these flanges are formed with a horizontal notch 31, 32 dimensioned to permit the engagement of the side edge of a desk top therein.

The two flanges 29, 30 are interconnected in the region of their notches 29, 30 by a metal member 33 cut to a configuration consistent with the contour of said notches and permitting the fastening of the apparatus on the edge of the top board of a desk or like piece of furniture or other support while contributing efficiently in the rigidity of the structure. When the apparatus is fastened on the edge of the desk top board it bears with the upper wing 34 of member 33 on the top face 35 of the desk, the apparatus being clamped thereon by tightening under said desk a screw 36 engaging nuts or like means 37 formed in or carried by the lower flange 38 of said member 33.

Figure 11:
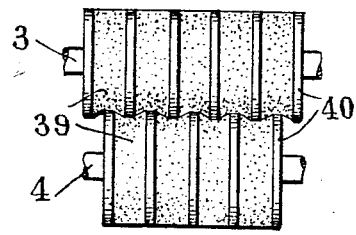
FIGURE 11 is an alternate form of embodiment of the rollers of this apparatus.

Of course, many modifications may be brought to the forms of embodiment described hereinabove with reference to the attached drawings without departing from the spirit and scope of the invention; thus, notably, the rollers or cylinders 1, 2 of the apparatus may be designed differently and consist for example each of alternate stacked elastic rings 39 and metal discs 40 (FIGURE 11) and be so arranged that the discs 40 of one roller resiliently engage the rings 39 of the other roller; on the other hand, the roller may also have rough surfaces to increase the adherence of the paper thereon, for example by using a grained surface or a surface containing granules or abrasive substances; furthermore, this apparatus may comprise means adapted to impart a certain treatment to the paper before its passage between the rollers in order to facilitate the tearing up or shredding thereof, such as wetting or lubrication for softening the paper, and/or any treatment or treatments designed to complete the destruction of the documents (mackling, or like blurring of the paper in order to make the torn strips illegible); if desired, other treatments may be contemplated for protecting the rollers against the considerable stress and strain to which they may be subjected in operation.

What I claim is:

1. An apparatus for destroying documents, which comprises two rollers having parallel axes and means for rotatably driving said rollers at equal peripheral speeds and in opposite directions to each other to permit the longitudinal feed, at right angles to said axes, of the documents to be destroyed immediately as said documents are engaged therebetween, other means arranged along the co-acting peripheral surfaces of said rollers and adapted to form in the documents fed therebetween longitudinal folds alternately in one and the other direction, accordion-wise, and, at the same time, to tear up said documents longitudinally between each series of two adjacent folds formed in opposite directions, whereby the documents are delivered from the apparatus in the form of shredded strips having deckled longitudinal edges, each strip having along its longitudinal axis a pronounced fold imparting thereto a stiffness permitting the proper delivery of said strips from the apparatus while avoiding any clogging and jamming thereof.

2. An apparatus for destroying documents, which comprises two document-feeding and tearing rollers having parallel axes which are formed by molding about their shafts a material having a relatively high coefficient of friction with paper, such as a thermoplastic or thermosetting resin, means for rotatably driving said rollers at equal peripheral speeds and in opposite directions to each other to permit the longitudinal feed, at right angles to said axes, of the documents to be destroyed immediately as they are engaged therebetween, other means arranged along the co-acting peripheral surfaces of said rollers and adapted to form in the documents fed therebetween longitudinal folds alternately in one and the other direction, accordion-wise, and, at the same time, to tear up said documents longitudinally between each series of two adjacent folds formed in opposite directions, whereby the documents are delivered from the apparatus in the form of narrow strips having the desired width and deckled longitudinal edges, each strip comprising along its longitudinal axis a pronounced fold imparting thereto an adequate stiffness permitting the proper delivery thereof from the apparatus while avoiding the clogging and jamming of the apparatus.

3. An apparatus for destroying documents, which comprises two rollers having parallel axes and screw means formed along the peripheral surface of each roller throughout the length thereof, the screw means of said rollers having opposite pitches, the outer edges of said threads being relatively sharp in order to break up the paper fibres at their root and form a pronounced fold in the paper and also simultaneously to produce a transverse tractive effort on the pleated paper for tearing the paper longitudinally between each series of two adjacent folds formed in opposite directions, whereby the documents are delivered from the apparatus in the form of narrow strips having the desired width and deckled longitudinal edges, each strip being formed along its longitudinal axis with a pronounced fold imparting thereto an adequate stiffness permitting the proper delivery thereof from the apparatus while avoiding any clogging and jamming thereof, and other means for rotatably driving said rollers at equal peripheral speeds.

4. An apparatus for destroying documents, which comprises a pair of rollers consisting each of a series of alternate elastic rings and metal discs of same diameter mounted on a common shaft, the discs of one roller coacting with the rings of the other to form in the documents fed therebetween longitudinal closely-spaced folds alternately in one and the other direction, accordion-wise, and at the same time, to apply to the thus pleated documents fed therebetween a transverse tractive effort for tearing up the documents longitudinally between each series of two oppositely-directed folds, whereby the documents are delivered from the apparatus in the form of narrow strips having the desired width and deckled longitudinal edges as well as a pronounced fold formed along the longitudinal axis of each strip so as to impart thereto a stiffness permitting the proper delivery thereof from the apparatus while avoiding any clogging and jamming thereof, and other means for rotatably driving said rollers at equal peripheral speeds.

5. An apparatus for destroying documents, which comprises a pair of rollers having parallel axes, means for rotatably driving said rollers at equal peripheral speeds and in opposite directions in order to permit the longitudinal feed, at right angles to said axes, of the documents to be destroyed immediately as these are inserted between said rollers, other means arranged along the co-acting peripheral surfaces of said rollers and adapted to form in the documents fed therebetween closely-spaced longitudinal folds directed alternately in one and the other direction, accordion-wise, and simultaneously to produce a transverse traction causing by tearing a longitudinal division of the documents between each series of two adjacent folds of opposite directions, whereby the documents are delivered from the apparatus in the form of narrow strips having the desired width, with deckled longitudinal edges and a pronounced fold formed along the longitudinal axis of each strip so as to impart thereto a stiffness permitting the proper delivery thereof from the apparatus while avoiding any clogging and jamming thereof, a casing having its concavity directed downwards and constituting a bearing support for the shafts of said pair of rollers, said casing being further adapted to fit on the top of a wastepaper basket, a slot formed in the upper portion of said casing above the line of interpenetration of said rollers, an aperture of greater dimensions formed in said casing in the vicinity of said slot for introducing into said basket other papers and objects of which the destruction is not deemed necessary.

References Cited
UNITED STATES PATENTS

| | | | |
|---|---|---|---|
| 1,168,809 | 1/1916 | Hogberg | 241—236 |
| 1,731,967 | 10/1929 | Antonsen | 225—3 |
| 1,939,246 | 12/1933 | Antonsen | 225—3 |
| 2,434,707 | 1/1948 | Marshall | 241—236 |
| 2,862,542 | 12/1958 | Norton | 156—594 X |
| 3,088,683 | 5/1963 | Joseph et al. | |

WILLIAM W. DYER, JR., *Primary Examiner.*

J. M. MEISTER, *Examiner.*